United States Patent [19]

Seidenberger

[11] 3,975,298

[45] Aug. 17, 1976

[54] SPILL CONTROL COMPOSITION AND USE THEREOF

[75] Inventor: James W. Seidenberger, Bethlehem, Pa.

[73] Assignee: J. T. Baker Chemical Company, Phillipsburg, N.J.

[22] Filed: Oct. 22, 1975

[21] Appl. No.: 624,589

[52] U.S. Cl. .............................. 252/430; 252/428
[51] Int. Cl.² ........................................ B01J 31/02
[58] Field of Search ............ 252/428, 430; 423/210

[56] References Cited
UNITED STATES PATENTS 3,725,530   4/1973   Kawase et al. ...................... 423/210
3,814,799   6/1974   Wygasch ............................. 423/210

*Primary Examiner*—Patrick P. Garvin
*Assistant Examiner*—William G. Wright
*Attorney, Agent, or Firm*—George W. Rauchfuss, Jr.; Eugene O. Retter

[57] ABSTRACT

A spill of liquid elemental mercury is cleaned up by being absorbed into a composition containing a granular metal, a metal powder and a non-hydroscopic solid acid.

10 Claims, No Drawings

SPILL CONTROL COMPOSITION AND USE THEREOF

FIELD OF THE INVENTION

The present invention relates to a composition for collecting spilled liquid elemental mercury.

BACKGROUND OF THE INVENTION

The toxicity of mercury is such that the element should not be allowed to contaminate air and water. Spilled mercury is often the source of mercury poisoning because it is finely divided and produces a relatively large amount of mercury vapor. Moreover, collecting all the spilled mercury in any particular spill is extremely difficult because of the high surface tension and high density of liquid elemental mercury.

Heretofore, granulated active charcoal containing iodine has been considered to be the best means of removing mercury vapor. However, the absorption rate and capacity of iodine bearing carbon for mercury is relatively low. More recently it has been proposed to employ a water soluble silver salt impregnated on a solid carrier and containing sufficient moisture for speedy reaction of the silver salt with mercury. This latter method, however, is not without its disadvantages and is unduly costly and requires an undue reaction time.

Therefore, there is a need for a composition of matter for taking up liquid elemental mercury at a relatively fast rate and at a cost that is not prohibitively expensive.

SUMMARY OF THE INVENTION

It has now been found that a composition composed of a granular metal, a metal powder and a non-hydroscopic solid acid is especially used for absorption of spilled liquid elemental mercury.

DETAILED DESCRIPTION OF INVENTION

The composition useful for the purpose of this invention is composed of 41 to 52% by weight of a granular metal selected from zinc or copper, 41 to 52% by weight of a metal powder selected from zinc or copper and 5 to 9% by weight of a non-hydroscopic solid acid selected from sulfamic, tartaric, citric, succinic or oxalic acid.

The granular metal is preferably of a particle size such that 100% passes through a U.S. No. 20 sieve with 95% being retained on a U.S. No. 40 sieve. The metal powder is preferably of a particle size such that 100% passes through a U.S. No. 200 sieve. While both the granular and powdered metal may be either zinc or copper, zinc is preferred as both the granular metal and metal powder components of the composition.

A preferred composition of the invention may be defined as comprising:

A. 52 parts ± 10% granular metal selected from zinc or copper, preferably zinc, of a particle size that 100% passes through a U.S. No. 20 sieve with 95% being retained on a U.S. No. 40 sieve, B. 52 parts ± 10% metal powder selected from zinc or copper, preferably zinc, of a particle size that 100% passes through a U.S. No. 200 sieve, and C. 8 parts ± 10% non-hydroscopic solid acid selected from sulfamic, tartaric, citric, succinic or oxalic acid, preferably sulfamic acid, wherein the parts are expressed as parts by weight.

An especially preferred composition comprises one having 52 parts granular zinc, 52 parts zinc powder and 8 parts sulfamic acid wherein the parts are parts by weight and the particle sizes are as hereinbefore set forth.

The composition of this invention is first activated by the addition and mixing of 5 to 10 ml of water to about 26 grams of the composition before placing the resulting paste over the mercury spill.

Usually following a mercury spill a majority of the mercury can be recovered by use of an aspirator bulb. After recovery of the bulk of a mercury spill in this manner a composition of this invention may be employed to recover substantially all the remaining elemental liquid mercury by applying the activated composition on the spill surface and pushing the paste across the area of the spill, such as by use of a wooden spatula. Droplets of mercury will be absorbed into the paste whereafter the used or saturated paste can readily be scraped off the spill surface and after drying can be placed into any suitable waste disposal container and disposed of in accordance with any applicable environmental disposal regulations.

From the foregoing it will be seen that a composition and method have been provided which will eliminate quickly and easily the hazard to persons working under conditions susceptible of mercury contamination due to spillage of liquid elemental mercury.

It will be understood that the embodiments discussed herein and the use for the embodiments are merely illustrative of my invention and that one skilled in the art can make suitable modifications thereof without departing from the spirit and intent of the invention.

What is claimed is:

1. A composition useful for the absorption of liquid elemental mercury comprising: 41 to 52% by weight of a granular metal selected from the group consisting of zinc and copper; 41 to 52% by weight of a metal powder selected from the group consisting of zinc and copper and 5 to 9% by weight of a non-hydroscopic solid acid selected from the group consisting of sulfamic, tartaric, citric, succinic or oxalic acid.

2. The composition of claim 1 wherein the granular metal is of a particle size such that 100% passes through a U.S. No. 20 sieve and 95% is retained on a U.S. No. 40 sieve and the metal powder is of a particle size such that 100% passes through a U.S. No. 200 sieve.

3. The composition of claim 2 wherein the granular metal is zinc.

4. The composition of claim 3 wherein the metal powder is zinc.

5. The composition of claim 4 wherein the acid is sulfamic acid.

6. The composition of claim 5 comprising 52 parts by weight granular zinc, 52 parts by weight zinc powder and 8 parts by weight sulfamic acid.

7. The composition of claim 1 activated for use in the absorption of spilled liquid elemental mercury comprising additionally from about 5 to 10 ml of water per 26 grams of the mixture of granular metal, metal powder and solid acid.

8. The composition of claim 6 activated for use in the absorption of spilled liquid elemental mercury comprising additionally from about 5 to 10 ml of water per 26 grams of the mixture of granular zinc, zinc powder and sulfamic acid.

9. A method for the absorption of spilled liquid elemental mercury comprising contacting said liquid elemental mercury with a composition of claim 7.

10. A method for the absorption of spilled liquid elemental mercury comprising contacting said liquid elemental mercury with a composition of claim 8.

* * * * *